(12) United States Patent
Ito et al.

(10) Patent No.: US 11,550,436 B2
(45) Date of Patent: Jan. 10, 2023

(54) TOUCH PANEL AND DISPLAY DEVICE

(71) Applicant: Shanghai Tianma Micro-Electronics Co., Ltd., Shanghai (CN)

(72) Inventors: Yukihiro Ito, Kawasaki (JP); Yuki Ito, Kawasaki (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/543,185

(22) Filed: Dec. 6, 2021

(65) Prior Publication Data
US 2022/0187949 A1 Jun. 16, 2022

(30) Foreign Application Priority Data

Dec. 11, 2020 (JP) .............................. JP2020-205632

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/04164* (2019.05); *G06F 2203/04107* (2013.01)

(58) Field of Classification Search
CPC ...... G06F 3/041–047; G06F 2203/041–04114; G06F 3/0445; G06F 3/04164; G06F 2203/04107; H01L 27/323
See application file for complete search history.

(56) References Cited

U.S. PATENT DOCUMENTS

2013/0270079 A1 10/2013 Xie et al.
2017/0123572 A1* 5/2017 Song ..................... G06F 3/0446
2019/0302942 A1* 10/2019 Kim .................... H01L 27/3223

FOREIGN PATENT DOCUMENTS

JP         2015-510188 A    4/2015

* cited by examiner

Primary Examiner — Sanjiv D. Patel
(74) Attorney, Agent, or Firm — Sughrue Mion, PLLC

(57) ABSTRACT

A touch panel includes a detection region that has a non-rectangular periphery shape, and a wiring region that surrounds the periphery of the detection region. In an alternating arrangement portion, of the periphery of the detection region, in which ends of first electrodes and ends of second electrodes are alternately positioned, first ends of the first electrodes and first wirings are electrically connected and second ends of the second electrodes face shield electrodes, or first ends of the second electrodes and second wirings are electrically connected and second ends of the first electrodes face the shield electrodes.

11 Claims, 6 Drawing Sheets

TOUCH PANEL AND DISPLAY DEVICE

CROSS-REFERENCE TO RELATED APPLICATION

This application claims the benefit of Japanese Patent Application No. 2020-205632, filed on Dec. 11, 2020, the entire disclosure of which is incorporated by reference herein.

FIELD

The present disclosure relates generally to a touch panel and a display device.

BACKGROUND

In the related art, touch panels are known that are provided on a display panel that displays text, images, and the like and that function as an interface for receiving user commands. For example, Unexamined Japanese Patent Application Publication (Translation of PCT Application) No. 2015-510188 describes a touch panel that includes a sensor region, first and second conductor wire regions electrically connected to the sensor region, and a ground wire provided between the first conductor wire region and the second conductor wire region.

With the touch panel of Unexamined Japanese Patent Application Publication (Translation of PCT Application) No. 2015-510188, a first conductor wire electrically connected to a first electrode of the sensor region is disposed in the first conductor wire region, and a second conductor wire electrically connected to a second electrode of the sensor region is disposed in the second conductor wire region. Accordingly, the ground wire is provided between the first conductor wire and the second conductor wire, and suppresses crosstalk between the first conductor wire and the second conductor wire. Moreover, with the touch panel of Unexamined Japanese Patent Application Publication (Translation of PCT Application) No. 2015-510188, the ground wire is disposed between the first electrode and the second conductor wire, and between the second electrode and the first conductor wire, and suppresses crosstalk between these constituents.

With the touch panel of Unexamined Japanese Patent Application Publication (Translation of PCT Application) No. 2015-510188, the periphery shape of the sensor region is rectangular. As such, an end of the first electrode and the first conductor wire are connected on one side of the periphery of the sensor region, and an end of the second electrode and the second conductor wire are connected on another side of the periphery of the sensor region.

However, with a touch panel for which the periphery shape of the sensor region is non-rectangular (for example, circular), a portion (hereinafter "alternating arrangement portion") occurs in which the end of one electrode of the sensor region and the end of the other electrode of the sensor region are alternately positioned. In the alternating arrangement portion, when the ends of the one electrode and the other electrode are respectively connected to corresponding conductor wires, the conductor wire connected to the one electrode and the conductor connected to the other electrode are repeatedly arranged in an alternating manner.

Due to this, when, as in the touch panel of Unexamined Japanese Patent Application Publication (Translation of PCT Application) No. 2015-510188, the ground wire is provided between the conductor wire connected to the one electrode and the other electrode, the frame of the touch panel becomes wider. Additionally, with the touch panel of Unexamined Japanese Patent Application Publication (Translation of PCT Application) No. 2015-510188, in order to arrange the ground wire between the electrode and the conductor wire, an insulation layer must be provided in the portion where the ground wire and a connection portion of the conductor wire and the electrode cross. Here, the insulation layer insulates the ground wire from the connection portion.

SUMMARY

A touch panel according to a first aspect of the present disclosure includes:

a detection region having a periphery shape that is non-rectangular, the detection region including a plurality of first electrodes that is disposed on a first main surface of a base having insulating properties and that extends in a first direction, and a plurality of second electrodes that is disposed on a second main surface of a side opposite the first main surface of the base and that extends in a second direction that crosses the first direction; and a wiring region that includes a plurality of first wirings disposed on the first main surface, a plurality of second wirings disposed on the second main surface, and a plurality of shield electrodes disposed on at least one of the first main surface and the second main surface, the wiring region surrounding a periphery of the detection region, wherein each of the plurality of first wirings is electrically connected to a first end of each of the plurality of first electrodes, each of the plurality of second wirings is electrically connected to a first end of each of the plurality of second electrodes, each of the plurality of shield electrodes is disposed facing each second end of at least one of the plurality of first electrodes and the plurality of second electrodes, the plurality of first wirings and the plurality of second wirings extend along the periphery of the detection region, and in an alternating arrangement portion in which the ends of the first electrodes and the ends of the second electrodes of the periphery of the detection region are alternately positioned, the first ends of the first electrodes are electrically connected to the first wirings and the second ends of the second electrodes face the shield electrodes, or the first ends of the second electrodes are electrically connected to the second wirings and the second ends of the first electrodes face the shield electrodes.

A display device according to a second aspect of the present disclosure includes:

the touch panel described above; and a display panel overlaid on the touch panel.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a touch panel according to various embodiments is described while referencing the drawings.

Embodiment 1

Figure 1:
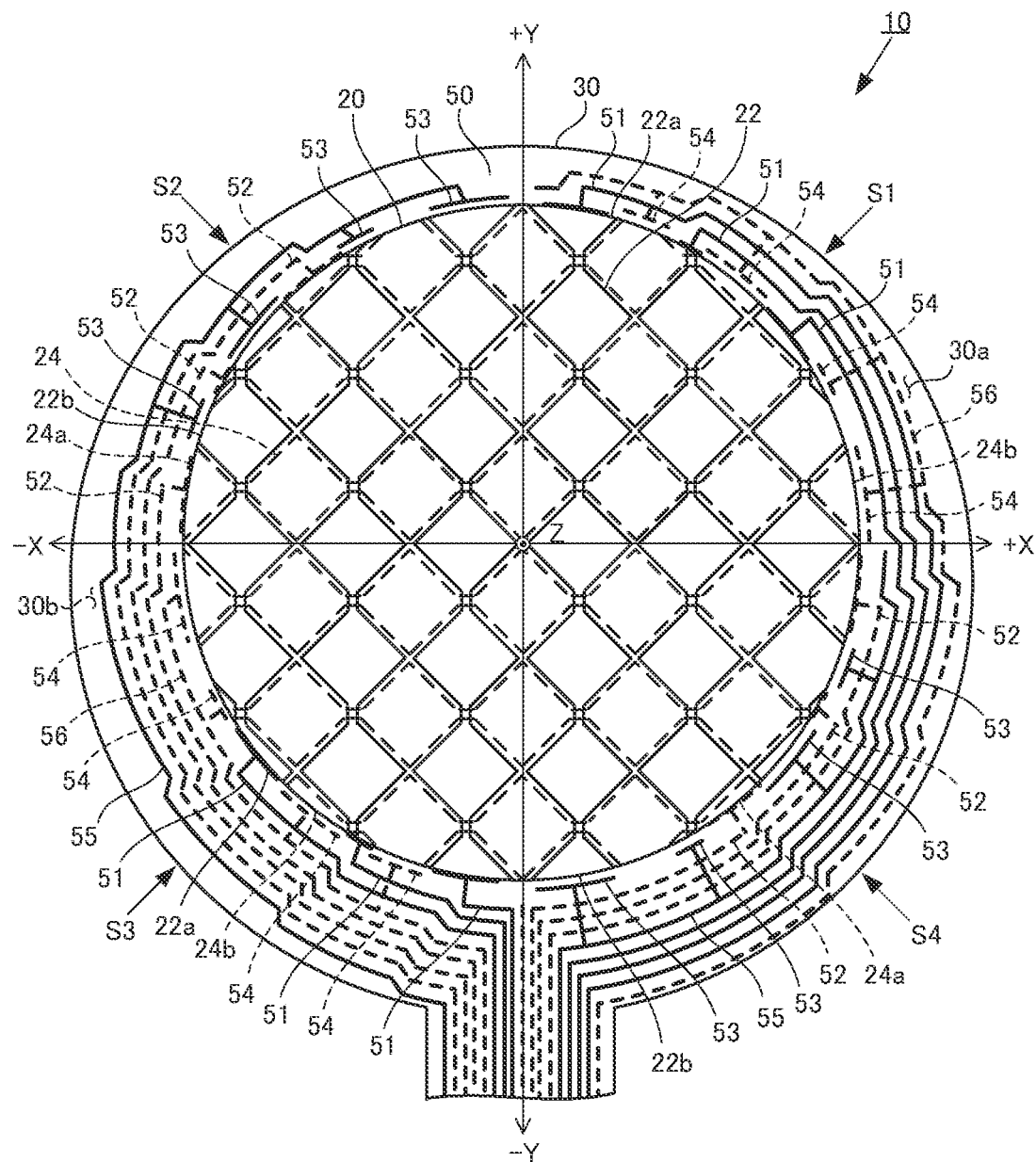
FIG. 1 is a plan view illustrating a touch panel according to Embodiment 1.

A touch panel 10 according to the present embodiment is described while referencing FIGS. 1 to 8. Firstly, the overall configuration of the touch panel 10 is described. The touch panel 10 is a projection-capacitive touch panel. As illustrated in FIG. 1, the touch panel 10 includes a detection region 20 and a wiring region 50. The detection region 20 and the wiring region 50 are formed on a base 30.

The detection region 20 of the touch panel 10 is a region that detects contact by a user. The periphery of the detection region 20 has a non-rectangular shape. The term "non-rectangular" means a shape that is not a rectangle. Example thereof include polygons of five or more angles, circles, ellipses, stars, hearts, wedges, and the like. In the present embodiment, the periphery shape of the detection region 20 is circular. The detection region 20 includes first electrodes 22 and second electrodes 24. The first electrodes 22 are provided on a first main surface 30a of the base 30, and the second electrodes 24 are provided on a second main surface 30b of the base 30.

The wiring region 50 of the touch panel 10 surrounds the periphery of the detection region 20. A plurality of first wirings 51, a plurality of second wirings 52, a plurality of first shield electrodes 53, a plurality of second shield electrodes 54, a first shield wire 55, and a second shield wire 56 are provided in the wiring region 50.

Figure 2:
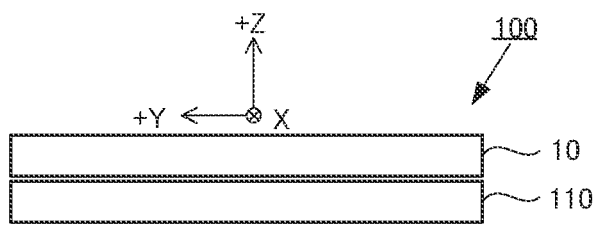
FIG. 2 is a schematic drawing illustrating a display device according to Embodiment 1.

As illustrated in FIG. 2, the touch panel 10 is overlaid on the display panel 110 that displays text, images, and the like.

The touch panel 10 and the display panel 110 constitute a display device 100. The display panel 110 is implemented as a liquid crystal display panel, an organic electro-luminescence (EL) display panel, or the like. The touch panel 10 functions as an interface that receives user commands.

In the present embodiment, to facilitate comprehension, a description is given in which, with the center of the circle of the detection region 20 of the touch panel 10 of FIG. 1 as the origin, the right direction (the right direction on paper) of the touch panel 10 is referred to as the "+X direction", the up direction (the up direction on paper) is referred to as the "+Y direction", and the direction perpendicular to the +X direction and the +Y direction (the front direction on paper) is referred to as the "+Z direction." Additionally, in the XY plane, a region located in a first orthant (X and Y are both positive) is referred to as a "first region S1", a region located in a second orthant (X is negative and Y is positive) is referred to as a "second region S2", a region located in a third orthant (X and Y are both negative) is referred to as a "third region S3", and a region located in a fourth orthant (X is positive and Y is negative) is referred to as a "fourth region S4." Furthermore, the plurality of first wirings 51 may be referred to as a "wiring group" of the first wirings 51, and the plurality of second wirings 52 may be referred to as a "wiring group" of the second wirings 52.

Next, the specific configuration of the touch panel 10 is described. The base 30 of the touch panel 10 has insulating properties. In one example, the base 30 is implemented as a glass substrate. The base 30 includes a first main surface 30a and a second main surface 30b on the side opposite the first main surface 30a.

The first electrodes 22 of the touch panel 10 are provided on the first main surface 30a of the base 30. The first electrodes 22 extend in a first direction (the Y direction in the present embodiment) in the detection region 20. The first electrodes 22 have a pattern in which the corners of a plurality of rectangles are connected in a line (a so-called "diamond pattern"). Each of the first electrodes 22 is electrically connected to each of the first wirings 51.

The second electrodes 24 of the touch panel 10 are provided on the second main surface 30b of the base 30. The second electrodes 24 extend in a second direction (the X direction in the present embodiment) that crosses the first direction in the detection region 20. As with the first electrodes 22, the second electrodes 24 have a pattern in which the corners of a plurality of rectangles are connected in a line. Each of the second electrodes 24 is electrically connected to each of the second wirings 52.

In one example, the first electrodes 22 and the second electrodes 24 are formed from indium tin oxide (ITO). When viewing the touch panel 10 from above, the first electrodes 22 and the second electrodes 24 cross at connections where the corners of the rectangles connect. The first electrodes 22 and the second electrodes 24 form capacitance with an indicator (for example, a finger, a pen, or the like) of the user. A non-illustrated controller (a drive circuit and a detection circuit) measures the formed capacitance via the first wirings 51 and the second wirings 52, thereby enabling detection of the position contacted by the indicator of the user (self-capacitance detection). Note that, the detection method is not limited to self-capacitance detection, and mutual capacitance detection may be used.

The first wirings 51 of the touch panel 10 are provided on the first main surface 30a of the base 30 in the wiring region 50. Each of the first wirings 51 is electrically connected to each end 22a of the first electrodes 22. The second wirings 52 of the touch panel 10 are provided on the second main surface 30b of the base 30 in the wiring region 50. Each of the second wirings 52 is electrically connected to each end 24a of the second electrodes 24. The first wirings 51 and the second wirings 52 extend along the periphery of the detection region 20 and are connected to the controller. The connections between the first electrodes 22 and the first wirings 51, and the connections between the second electrodes 24 and the second wirings 52 are described later.

The first shield electrodes 53 of the touch panel 10 are provided on the first main surface 30a of the base 30 in the wiring region 50. Each of the first shield electrodes 53 is adjacent to and faces each end 22b of the first electrodes 22. The first shield electrodes 53 suppress crosstalk between the first electrodes 22 and the second wirings 52. The arrangement of the first shield electrodes 53 is described later.

The second shield electrodes 54 of the touch panel 10 are provided on the second main surface 30b of the base 30 in the wiring region 50. Each of the second shield electrodes 54 is adjacent to and faces each end 24b of the second electrodes 24. The second shield electrodes 54 suppress crosstalk between the second electrodes 24 and the first wirings 51. The arrangement of the second shield electrodes 54 is described later.

The first shield wire 55 of the touch panel 10 is provided on the first main surface 30a of the base 30 in the wiring region 50. The first shield wire 55 is electrically connected to the first shield electrodes 53. When viewing the touch panel 10 from above, the first shield wire 55 extends along the periphery of the region in which the second wirings 52 are arranged. Specifically, one first shield wire 55 extends to the second region S2 and the third region S3 outside the wiring group of the first wirings 51, the second shield wire 56, and the wiring group of the second wirings 52. Another first shield wire 55 extends to the fourth region S4 outside the wiring group of the second wirings 52, and is positioned between the wiring group of the second wirings 52 and the wiring group of the first wirings 51. Due to this configuration, the first shield wire 55 suppresses crosstalk between the first wirings 51 and the second wirings 52. It is preferable that ground potential or a predetermined potential is supplied to the first shield wire 55.

The second shield wire 56 of the touch panel 10 is provided on the second main surface 30b of the base 30 in the wiring region 50. The second shield wire 56 is electrically connected to the second shield electrodes 54. When viewing the touch panel 10 from above, the second shield wire 56 extends along the periphery of the region in which the first wirings 51 are arranged. Specifically, one second shield wire 56 extends to the first region S1 and the fourth region S4 outside the wiring group of the second wirings 52, the first shield wire 55, and the wiring group of the first wirings 51. Another second shield wire 56 extends to the third region S3 outside the wiring group of the first wiring 51, and is positioned between the wiring group of the first wirings 51 and the wiring group of the plurality of second wirings 52. Due to this configuration, the second shield wire 56 suppresses crosstalk between the first wirings 51 and the second wirings 52. It is preferable that ground potential or a predetermined potential is supplied to the second shield wire 56.

The connections between the first electrodes 22 and the first wirings 51, and the arrangement of the second shield electrodes 54 are described using the first region S1 and the third region S3 as an example. The first region S1 and the third region S3 of the detection region 20 are an example of two regions that are not adjacent in the detection region 20 that is divided in the circumferential direction into four equal sections.

Figure 3:
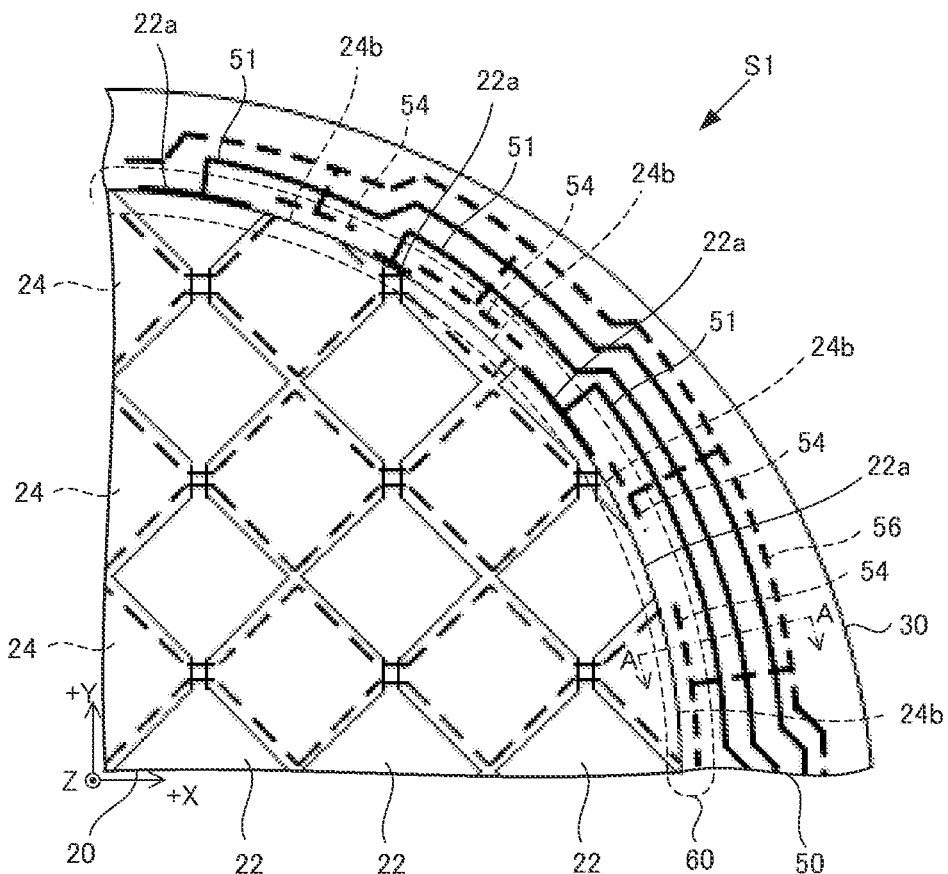
FIG. 3 is a plan view illustrating a first region of the touch panel according to Embodiment 1.

As illustrated in FIG. 3, at the periphery of the first region S1 of the detection region 20, the ends 22a of the first electrodes 22 on the +X side and the ends 24b of the second electrodes 24 on the +Y side are alternately positioned. In the present embodiment, the ends 22a of the first electrodes 22 are connected to the first wirings 51 and the ends 24b of the second electrodes 24 face the second shield electrodes 54. As such, in a portion 60 in which the ends 22a of the first electrodes 22 and the ends 24b of the second electrodes 24 are alternately positioned, only the first electrodes 22 are connected to wirings (the first wirings 51), and the second electrodes 24 are not connected to wirings (the second wirings 52). Accordingly, it is unnecessary to provide a shield wire every instance between the first wirings 51 connected to the first electrodes 22 and the second wirings 52 connected to the second electrodes 24, and the frame of the touch panel 10 can be made narrower. In the following, the portion in which one of the ends 22a and the ends 22b of the first electrodes 22 and one of the ends 24a and the ends 24b of the second electrodes 24 are alternately positioned is referred to as an "alternating arrangement portion 60."

Figure 4:
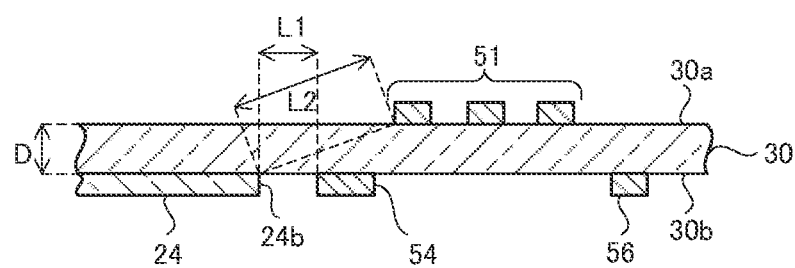
FIG. 4 is a cross-sectional view of the first region of the touch panel illustrated in FIG. 3, taken along line A-A.
Figure 5:
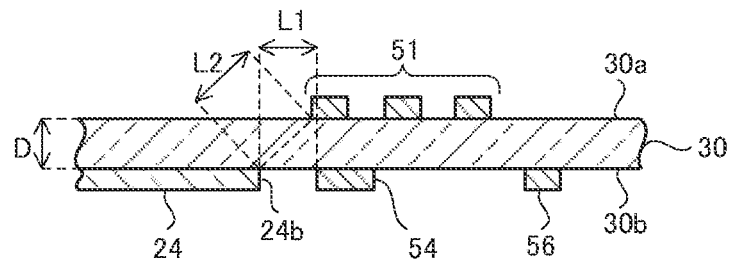
FIG. 5 is a cross-sectional view illustrating an example of positional relationships between a second electrode, a second shield electrode, and first wirings according to Embodiment 1.

Additionally, at the periphery of the first region S1 of the detection region 20, the ends 24b of the second electrodes 24 are adjacent to and face the second shield electrodes 54. The second electrodes 24 and the second shield electrodes 54 are provided on the second main surface 30b of the base 30, and the first wirings 51 are provided on the first main surface 30a of the base 30. As such, as illustrated in FIG. 4, a distance L1 between the end 24b of the second electrode 24 and the second shield electrode 54 can easily be made shorter than a distance L2 between the end 24b of the second electrodes 24 and the first wirings 51. As such, the coupling capacitance between the second electrodes 24 and the second shield electrodes 54 can be made greater than the coupling capacitance between the second electrodes 24 and the first wirings 51, and crosstalk between the second electrodes 24 and the first wirings 51 can be suppressed. Furthermore, in a case in which, when viewed from above, the second shield electrodes 54 and a portion of the wiring group of the first wirings 51 overlap, as illustrated in FIG. 5, the distance L2 between the end 24b of the second electrode 24 and the first wirings 51 can be increased an amount corresponding to a thickness D of the base 30 and, as such, the first wirings 51 can be brought closer to the second electrode 24 and the frame of the touch panel 10 can be made narrower.

As illustrated in FIG. 1, at the periphery of the third region S3 of the detection region 20, the ends 22a of the first electrodes 22 on the −X side and the ends 24b of the second electrodes 24 on the −Y side are alternately positioned. As in the first region S1, in the alternating arrangement portion 60 of the third region S3, only the first electrodes 22 are connected to wirings (the first wirings 51), and the second electrodes 24 are not connected to wirings (the second wirings 52). Additionally, as in the first region S1, the ends 22b of the second electrodes 24 are adjacent to and face the second shield electrodes 54. Accordingly, as in the first region S1, in the third region S3, crosstalk between the second electrodes 24 and the first wirings 51 can be suppressed, and the frame of the touch panel 10 can be made narrower.

Next, the connections between the second electrodes 24 and the second wirings 52, and the arrangement of the first shield electrodes 53 are described using the second region S2 and the fourth region S4 as an example. The second region S2 and the fourth region S4 are an example of two regions that are not adjacent in the detection region 20 that is divided in the circumferential direction into four equal sections.

Figure 6:
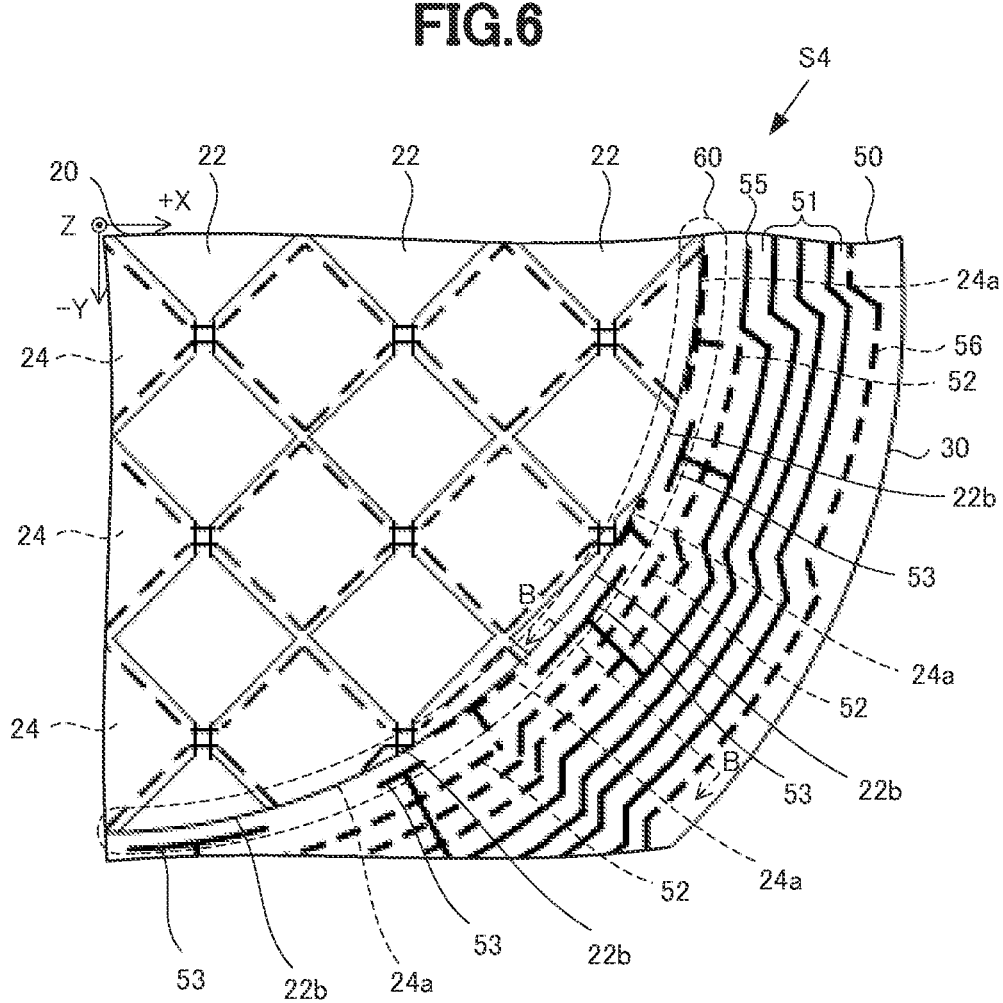
FIG. 6 is a plan view illustrating a fourth region of the touch panel according to Embodiment 1.

As illustrated in FIG. 6, at the periphery of the fourth region S4 of the detection region 20, the ends 22b of the first electrodes 22 on the +X side and the ends 24a of the second electrodes 24 on the −Y side are alternately positioned. In the alternating arrangement portion 60 of the fourth region S4, the ends 24a of the second electrodes 24 are connected to the second wirings 52, and the ends 22b of the first electrodes 22 face the first shield electrodes 53. That is, only the second electrodes 24 are connected to wirings (the second wirings 52). Accordingly, as in the first region S1, it is unnecessary to provide a shield wire every instance between the first wirings 51 connected to the first electrodes 22 and the second wirings 52 connected to the second electrodes 24, and the frame of the touch panel 10 can be made narrower.

Figure 7:
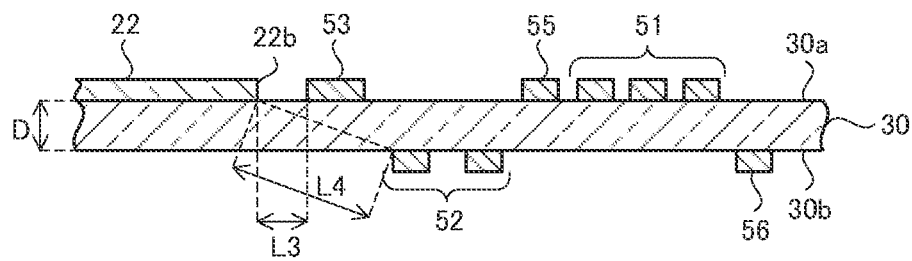
FIG. 7 is a cross-sectional view of the fourth region of the touch panel illustrated in FIG. 6, taken along line B-B.
Figure 8:
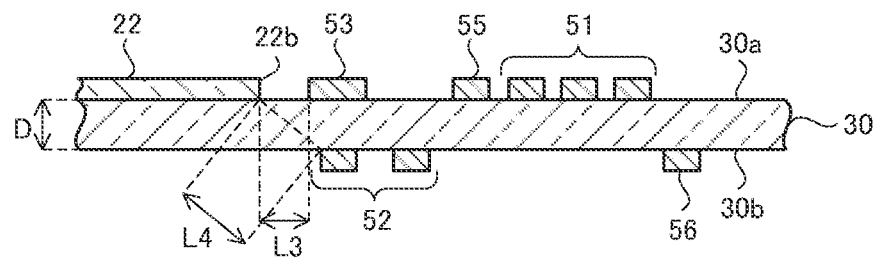
FIG. 8 is a cross-sectional view illustrating an example of positional relationships between a first electrode, a first shield electrode, and second wirings according to Embodiment 1.

At the periphery of the fourth region S4 of the detection region 20, the ends 22b of the first electrodes 22 are adjacent to and face the first shield electrodes 53. Additionally, the first electrodes 22 and the first shield electrodes 53 are provided on the first main surface 30a of the base 30, and the second wirings 52 are provided on the second main surface 30b of the base 30. Accordingly, as illustrated in FIG. 7, a distance L3 between the end 22b of the first electrode 22 and the first shield electrode 53 can easily be made shorter than a distance L4 between the end 22b of the first electrode 22 and the second wirings 52. As such, the coupling capacitance between the first electrodes 22 and the first shield electrodes 53 can be made greater than the coupling capacitance between the first electrodes 22 and the second wirings 52, and crosstalk between the first electrodes 22 and the second wirings 52 can be suppressed. Furthermore, as illustrated in FIG. 8, the distance L4 is longer than the distance L3 by an amount corresponding to the thickness D of the base 30 and, as such, when viewed from above, the first shield electrode 53 and a portion of the wiring group of the second wirings 52 are disposed overlapping. As a result, crosstalk between the first electrodes 22 and the second wirings 52 can be suppressed and the frame of the touch panel 10 can be made narrower.

As illustrated in FIG. 1, at the periphery of the second region S2 of the detection region 20, the ends 22b of the first electrodes 22 on the −X side and the ends 24a of second electrodes 24 on the +Y side are alternately positioned. As in the fourth region S4, in the alternating arrangement portion 60 of the second region S2, only the second electrodes 24 are connected to wirings (the second wirings 52), and the first electrodes 22 are not connected to wirings (the first wirings 51). Additionally, as in the fourth region S4, in the second region S2, the ends 22b of the first electrodes 22 are adjacent to and face the first shield electrodes 53. Accordingly, in the second region S2 as well, crosstalk between the first electrodes 22 and the second wirings 52 can be suppressed, and the frame of the touch panel 10 can be made narrower.

As described above, in the alternating arrangement portion 60 of the first region S1 and the third region S3, the ends 22a of the first electrodes 22 are connected to the first wirings 51, and the ends 24b of the second electrodes 24 face the second shield electrodes 54. As such, crosstalk between the second electrodes 24 and the first wirings 51 can be suppressed and the frame of the touch panel 10 can be made narrower. In the alternating arrangement portion 60 of the second region S2 and the fourth region S4, the ends 24a of the second electrodes 24 are connected to the second wirings 52, and the ends 22b of the first electrodes 22 face the first shield electrodes 53. As such, crosstalk between the second electrodes 24 and the first wirings 51 can be suppressed and the frame of the touch panel 10 can be made narrower.

Embodiment 2

In Embodiment 1, the periphery shape of the detection region 20 is circular. But the periphery shape of the detection region 20 is not limited to being circular.

Figure 9:
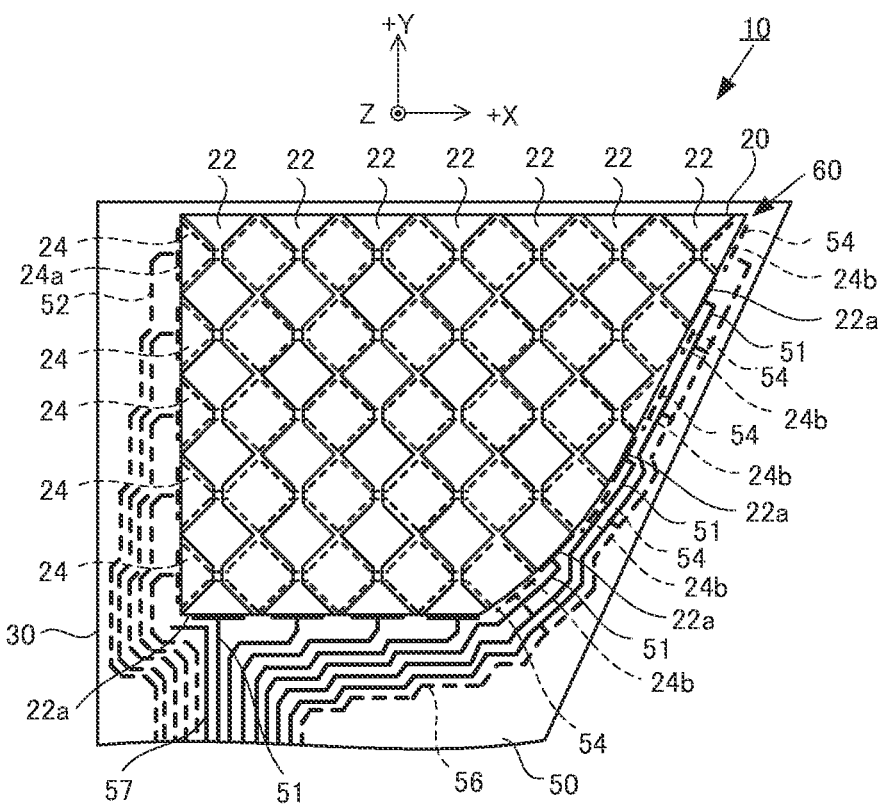
FIG. 9 is a plan view illustrating a touch panel according to Embodiment 2.

As with the touch panel 10 of Embodiment 1, a touch panel 10 according to the present embodiment includes a detection region 20 and a wiring region 50 on a base 30. As illustrated in FIG. 9, the detection region 20 of the present embodiment has a shape similar to a trapezoid and that includes a curved portion. Additionally, the touch panel 10 of the present embodiment includes a plurality of first electrodes 22 and a plurality of second electrodes 24 in the detection region 20. Furthermore, the touch panel 10 of the present embodiment includes, in the wiring region 50, a plurality of first wirings 51, a plurality of second wirings 52, a plurality of second shield electrodes 54, and a second shield wire 56. In the present embodiment, to facilitate comprehension, a description is given in which, in FIG. 9, the right direction (the right direction on paper) of the touch panel 10 is referred to as the "+X direction", the up direction (the up direction on paper) is referred to as the "+Y direction", and the direction perpendicular to the +X direction and the +Y direction (the front direction on paper) is referred to as the "+Z direction."

Here, the connections between the first electrodes 22 and the first wirings 51, the connections between the second electrodes 24 and the second wirings 52, and the arrangement of the second shield electrodes 54 are described. The other configurations are the same as in Embodiment 1.

In the present embodiment, the ends 24a of the second electrodes 24 are connected to the second wirings 52 on the −X side side of the periphery of the detection region 20. Additionally, the ends 22a of a portion of the first electrodes 22 (the four first electrodes 22 positioned on the −X side) are connected to the first wirings 51 on the −Y side side of the periphery of the detection region 20. Note that the shield wire 57 is arranged between the wiring group of the second wirings 52 extending from the −X side side and the wiring group of the first wirings 51 extending from the −Y side side.

In the present embodiment, the ends 22a of the first electrodes 22 and the ends 24b of the second electrodes 24 are alternately positioned in the curved portion positioned on the +X side of the periphery of the detection region 20. In this alternating arrangement portion 60, the remaining portion of the first electrodes 22 (the three first electrodes 22 positioned on the +X side) are connected to the first wirings 51. Additionally, in the alternating arrangement portion 60, the ends 22b of the second electrodes 24 are adjacent to and face the second shield electrodes 54.

Accordingly, as in the first region S1 of Embodiment 1, in the alternating arrangement portion 60, only the first electrodes 22 are connected to wirings (the first wirings 51), and the second electrodes 24 are not connected to wirings (the second wirings 52). As such, it is unnecessary to provide a shield wire every instance between the first wirings 51 and the second wirings 52, and the frame of the touch panel 10 can be made narrower.

As in the first region S1 of Embodiment 1, the distance L1 between the end 24b of the second electrode 24 and the second shield electrodes 54 can easily be made shorter than the distance L2 between the end 24b of the second electrode 24 and the first wirings 51, and the coupling capacitance between the second electrodes 24 and the second shield electrodes 54 can be made greater than the coupling capacitance between the second electrodes 24 and the first wirings 51. As a result, crosstalk between the second electrodes 24 and the first wirings 51 can be suppressed. Furthermore, when viewed from above, the second shield electrode 54 and a portion of the wiring group of the first wirings 51 are disposed overlapping. As a result, crosstalk between the second electrodes 24 and the first wirings 51 can be suppressed and the frame of the touch panel 10 can be made narrower.

As described above, in the alternating arrangement portion 60, the ends 22a of the first electrodes 22 are connected to the first wirings 51, and the ends 24b of the second electrodes 24 face the second shield electrodes 54. As such, crosstalk between the second electrodes 24 and the first wirings 51 can be suppressed and the frame of the touch panel 10 can be made narrower.

Modified Examples

Embodiments have been described, but various modifications can be made to the present disclosure without departing from the spirit and scope of the present disclosure.

For example, in Embodiment 1, the periphery shape of the detection region 20 is circular. However, a configuration is possible in which the periphery shape of the detection region 20 is elliptical.

Figure 10:
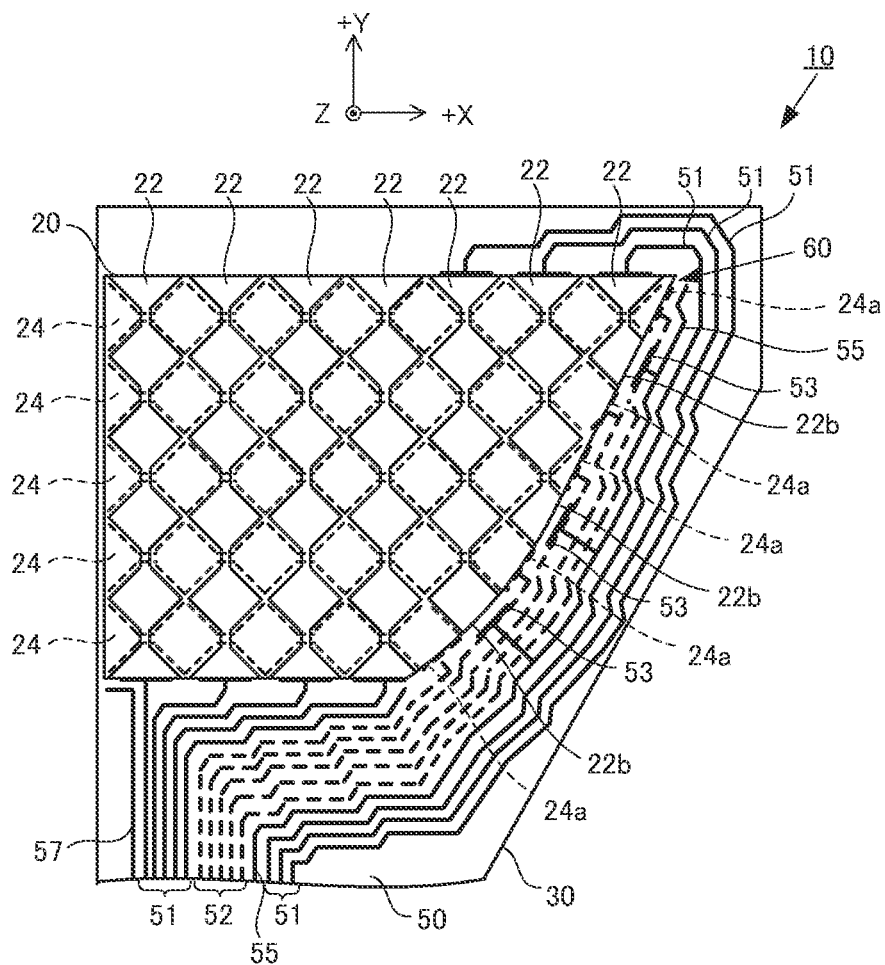
FIG. 10 is a plan view illustrating a touch panel according to a modified example.

In Embodiment 2, in the alternating arrangement portion 60, the ends 22a of the first electrodes 22 are connected to the first wirings 51, and the ends 24b of the second electrodes 24 face the second shield electrodes 54. However, a configuration is possible in which, in the alternating arrangement portion 60, as illustrated in FIG. 10, the ends 24a of the second electrodes 24 are connected to the second wirings 52, and the ends 22b of the first electrodes 22 face the first shield electrodes 53.

Figure 11:
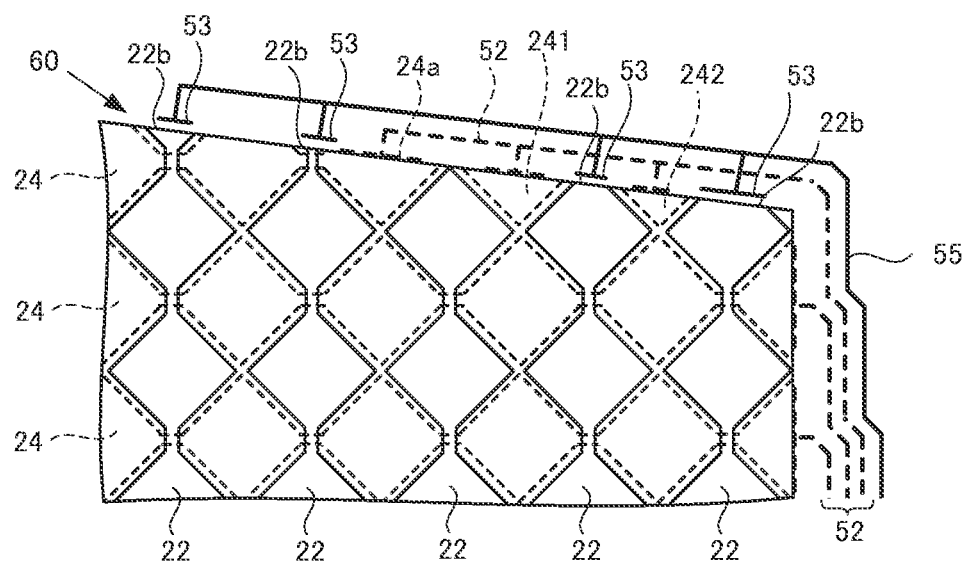
FIG. 11 is a plan view illustrating separated electrodes according to a modified example.

When the periphery shape of the detection region 20 is non-rectangular, as illustrated in FIG. 11, a portion of the second electrodes 24 may be cut off by the periphery of the detection region 20, and separated electrodes 241 and 242 separated from the second electrodes 24 may be disposed along the direction in which those second electrodes 24 extend. In such a case, it is preferable that the separated electrodes 241 and 242 are connected to one of the second wirings 52 together with the original second electrodes 24. With such a configuration, the detection range of the touch panel 10 can be expanded. Likewise, in a case in which a portion of the first electrodes 22 is cut off by the periphery of the detection region 20, it is preferable that the separated electrodes, separated from the first electrodes 22, are connected to one of the first wirings 51 together with the original first electrodes 22.

In Embodiment 1 and Embodiment 2, the base 30 is implemented as a glass substrate, but a configuration is possible in which the base 30 is implemented as an insulating layer. Additionally, the first direction in which the first electrodes 22 extend is not limited to the Y direction. The second direction in which the second electrodes 24 extend is not limited to the X direction. It is sufficient that the first electrodes 22 and the second electrodes 24 extend in directions that cross each other.

Figure 12:
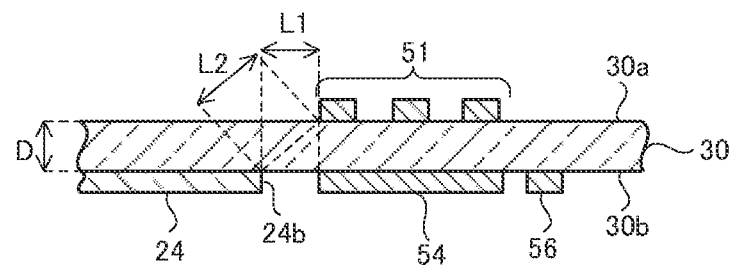
FIG. 12 is a cross-sectional view illustrating an example of positional relationships between a second electrode, a second shield electrode, and first wirings according to a modified example.
Figure 13:
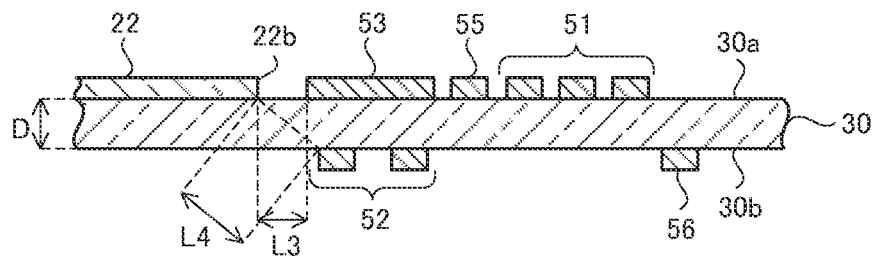
FIG. 13 is a cross-sectional view illustrating an example of positional relationships between a first electrode, a first shield electrode, and second wirings according to a modified example.

In the example of Embodiment 1 (FIG. 5), the second shield electrodes 54 and a portion of the wiring group of the first wirings 51 are disposed overlapping when viewed from above. However, a configuration is possible in which, as illustrated in FIG. 12, the second shield electrodes 54 and the wiring group of the first wirings 51 are disposed overlapping when viewed from above. Additionally, a configuration is possible in which, as illustrated in FIG. 13, the first shield electrodes 53 and the wiring group of the second wirings 52 are disposed overlapping when viewed from above.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A touch panel, comprising:
a detection region having a periphery shape that is non-rectangular, the detection region including a plurality of first electrodes that is disposed on a first main surface of a base having insulating properties and that extends in a first direction, and a plurality of second electrodes that is disposed on a second main surface of a side opposite the first main surface of the base and that extends in a second direction that crosses the first direction; and
a wiring region that includes a plurality of first wirings disposed on the first main surface, a plurality of second wirings disposed on the second main surface, and a plurality of shield electrodes disposed on at least one of the first main surface and the second main surface, the wiring region surrounding a periphery of the detection region, wherein
each of the plurality of first wirings is electrically connected to a first end of each of the plurality of first electrodes,
each of the plurality of second wirings is electrically connected to a first end of each of the plurality of second electrodes,
each of the plurality of shield electrodes is disposed facing each second end of at least one of the plurality of first electrodes and the plurality of second electrodes,
the plurality of first wirings and the plurality of second wirings extend along the periphery of the detection region, and
in an alternating arrangement portion in which the ends of the first electrodes and the ends of the second electrodes of the periphery of the detection region are alternately positioned, the first ends of the first electrodes are electrically connected to the first wirings and the second ends of the second electrodes face the shield electrodes, or the first ends of the second electrodes are electrically connected to the second wirings and the second ends of the first electrodes face the shield electrodes.

2. The touch panel according to claim 1, wherein
when the second ends of the first electrodes face the shield electrodes in the alternating arrangement portion, a coupling capacitance between the first electrodes and the shield electrodes is greater than a coupling capacitance between the first electrodes and the second wirings, and when the second ends of the second electrodes face the shield electrodes in the alternating arrangement portion, a coupling capacitance between the second electrodes and the shield electrodes is greater than a coupling capacitance between the second electrodes and the first wirings.

3. The touch panel according to claim 1, wherein
when the second ends of the first electrodes face the shield electrodes in the alternating arrangement portion, the shield electrodes overlap at least a portion of the plurality of second wirings when viewed from above, and
when the second ends of the second electrodes face the shield electrodes in the alternating arrangement portion, the shield electrodes overlap at least a portion of the plurality of first wirings when viewed from above.

4. The touch panel according to claim 1, wherein
in the alternating arrangement portion, the first ends of the first electrodes are electrically connected to the first wirings, and
a first separated electrode, that is separated from one of the first electrodes and that is disposed in a direction which the one first electrode extends, is provided, and the one first electrode and the first separated electrode are electrically connected to one of the first wirings.

5. The touch panel according to claim 1, wherein
in the alternating arrangement portion, the first ends of the second electrodes are electrically connected to the second wirings, and
a second separated electrode, that is separated from one of the second electrodes and that is disposed in a direction which the one second electrode extends, is provided, and the one second electrode and the second separated electrode are electrically connected to one of the second wirings.

6. The touch panel according to claim 1, further comprising:
a shield wire that is provided in the wiring region and that is electrically connected to the shield electrodes.

7. The touch panel according to claim 6, wherein when viewed from above,
all of the first wirings extend within a predetermined first region along the periphery of the detection region,
all of the second wirings extend within a predetermined second region being different from the first region along the periphery of the detection region, and
the shield wire connected to the shield electrodes that face the first electrodes extends along a periphery of the second region.

8. The touch panel according to claim 6, wherein when viewed from above,
all of the first wirings extend within a predetermined first region along the periphery of the detection region,
all of the second wirings extend within a predetermined second region being different from the first region along the periphery of the detection region, and
the shield wire connected to the shield electrodes that face the second electrodes extends along a periphery of the first region.

9. The touch panel according to claim 6, wherein a ground potential or a predetermined potential is supplied to the shield wire.

10. The touch panel according to claim 1, wherein
when a periphery shape of the detection region is circular or elliptical, the detection region is divided into four equal regions, and two regions, of the detection region that is divided into four equal regions, that are not adjacent are one set,
in the alternating arrangement portion of a first set, the first ends of the first electrodes are electrically connected to the first wirings, and the second ends of the second electrodes face the shield electrodes, and
in the alternating arrangement portion of a second set, the first ends of the second electrodes are electrically connected to the second wirings, and the second ends of the first electrodes face the shield electrodes.

11. A display device, comprising:
the touch panel according to claim 1; and
a display panel overlaid on the touch panel.

* * * * *